(12) United States Patent
Mei et al.

(10) Patent No.: US 12,476,020 B2
(45) Date of Patent: Nov. 18, 2025

(54) METHODS OF MAKING N-DOPED TRANSPARENT ORGANIC CONDUCTORS AND CONDUCTORS MADE THEREFROM

(71) Applicant: Purdue Research Foundation, West Lafayette, IN (US)

(72) Inventors: Jianguo Mei, West Lafayette, IN (US); Ke Chen, Lafayette, IN (US); Ashkan Abtahi, Hillsboro, OR (US); Jinhyo Hwang, West Lafayette, IN (US); Zhifan Ke, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/383,825

(22) Filed: Oct. 25, 2023

(65) Prior Publication Data

US 2024/0170178 A1 May 23, 2024

Related U.S. Application Data

(60) Provisional application No. 63/419,540, filed on Oct. 26, 2022.

(51) Int. Cl.
| | | |
|---|---|---|
| *C07D 515/20* | (2006.01) | |
| *C07D 515/12* | (2006.01) | |
| *H01B 1/12* | (2006.01) | |
| *H01B 1/22* | (2006.01) | |
| *H01B 5/14* | (2006.01) | |

(52) U.S. Cl.
CPC ............ *H01B 1/127* (2013.01); *H01B 1/22* (2013.01); *H01B 5/14* (2013.01)

(58) Field of Classification Search
CPC .......... H01B 1/12; H01B 1/124; H01B 1/127; H01B 1/22; H01B 5/14; C07D 515/20; C07D 515/12; C07D 515/00; C08G 2261/43; C08G 2261/40
See application file for complete search history.

(56) References Cited

U.S. PATENT DOCUMENTS

2023/0312785 A1* 10/2023 Huang ..................... C08L 65/00
526/256

OTHER PUBLICATIONS

High-Temperature Conducting Polymers, Zhifan Ke, Department of Chemistry West Lafayette, Indiana, Dec. 2023.*
Bromination of Carbon and Formation of PBDD/Fs by Copper Bromide in Oxidative Thermal Process, Kojima et al., Journal of Hazardous Materials 403 (2021) 123878.*
Griggs et al., n-Type organic semiconducting polymers: stability limitations, design considerations and applications. J. Mater. Chem. C 9, 8099-8128 (2021).
Jung et al., Experimental and numerical investigation of flexibility of ITO electrode for application in flexible electronic devices. Microsyst. Technol. 23, 1961-1970 (2017).
Yang et al., A high-conductivity n-type polymeric ink for printed electronics. Nat. Commun. 12, 1-8 (2021).
Guo et al., The journey of conducting polymers from discovery to application. Nat. Mater. 19, 922-928 (2020).

(Continued)

*Primary Examiner* — Haidung D Nguyen
(74) *Attorney, Agent, or Firm* — Piroozi-IP, LLC (57) ABSTRACT

A transparent conductor (TC) is disclosed. The TC includes an n-doped conducting polymer on a transparent substrate. Thickness of the n-doped polymerized agent is between about 10 to about 200 nm.

9 Claims, 9 Drawing Sheets

(56) References Cited

OTHER PUBLICATIONS

Wang et al., A Highly Stretchable, Transparent, and Conductive Polymer. Sci. Adv. 3, e1602076 (2017).
Sun et al., Aerobic oxidation of 2, 3, 6-trimethylphenol to trimethyl-1, 4-benzoquinone with copper (II) chloride as catalyst in ionic liquid and structure of the active species. J. Am. Chem. Soc. 126, 9550-9551 (2004).
Worfolk et al., Ultrahigh electrical conductivity in solution-sheared polymeric transparent films. Proc. Natl. Acad. Sci. 112, 14138-14143 (2015).
Alsufyani et al., Lactone Backbone Density in Rigid Electron-Deficient Semiconducting Polymers Enabling High n-type Organic Thermoelectric Performance. Angew. Chem. Int. Ed., 61 (2022).
Lei et al., A BDOPV-Based Donor-Acceptor Polymer for High-Performance n-Type and Oxygen-Doped Ambipolar Field-Effect Transistors. Adv. Mater., 25, 6589-6593 (2013).
Zhang et al., bis(2-oxoindolin-3-ylidene)-benzodifuran-dione containing copolymer for high-mobility ambipolar transistors. Chem. Commun., 50, 3180 (2014).
Lei et al., Electron-Deficient Poly(p-phenylene vinylene) Provides Electron Mobility over 1 $cm^2$ $V^{-1}$ $s^{-1}$ under Ambient Conditions. J. Am. Chem. Soc., 135, 12168-12171 (2013).
Wang et al., Bis(2-oxoindolin-3-ylidene)-benzodifuran-dione and bithiophene-based conjugated polymers for high performance ambipolar organic thin-film transistors: the impact of substitution positions on bithiophene units. J. Mater. Chem. C, 4, 6391-6400 (2016).
Singla et al., Multifunctional geometrical isomers of ferrocenebenzo[1,2-b:4,5-b0]difuran-2,6-(3H,7H)-dione adducts: second-order nonlinear optical behaviour and charge transport in thin film OFET devices. J. Mater. Chem. C, 5, 697-708 (2017).
Becker et al., Oxidative Conversions of 2,2/-Diphenoquinone Valence Isomers with 2,3-Dichloro-5,6-dicyanobenzoquinone. Synthesis and Spectroscopic Properties of (£)-[3,3/]Bibenzofuranylidene-2,2,-diones (Isoxindigos). J. Org. Chem., 47, 1095-1101 (1982).
Bigi et al., A new entry to (E)-[3,3'] bibenzofuranylidene-2,2"-diones (Isoxindigos). Tetrahedron, vol. 39, Issue 13, 2147-2150 (1983).
Tang et al., A solution-processed n-type conducting polymer with ultrahigh conductivity. Nature 1-2 (2022).
Bhatia et al., A critical review of experimental results on low temperature charge transport in carbon nanotubes based composites. Rev. Phys. 3, 15-25 (2018).
Anand et al., Introduction of a novel figure of merit for the assessment of transparent conductive electrodes in photovoltaics: Exact and approximate form. Adv. Energy Mater. 11, 2100875 (2021).
Hecht et al., Emerging transparent electrodes based on thin films of carbon nanotubes, graphene, and metallic hanostructures. Adv. Mater. 23, 1482-1513 (2011).
Wang et al., Thermoelectric properties of solution-processed n-doped ladder-type conducting polymers. Adv. Mater. 28, 10764-10771 (2016).
Li et al., Printable transparent conductive films for flexible electronics. Adv. Mater. 30, 1704738 (2018).
Zhang et al., Thin-Metal-Film-Based Transparent Conductors: Material Preparation, Optical Design, and Device Applications. Adv. Opt. Mater. 9, 2001298 (2021).
Fan et al., PEDOT: PSS for flexible and stretchable electronics: modifications, strategies, and applications. Adv. Sci. 6, 1900813 (2019).
Lu et al., Rigid coplanar polymers for stable n-type polymer thermoelectrics. Angew. Chem. 131, 11512-11516 (2019).
Bejan et al., Lactone-derived carbon-centered radicals: formation and reactivity with oxygen. Org. Lett. 3, 4059-4062 (2001).
Deng et al., N-acylation: an effective method for reducing the LUMO energy levels of conjugated polymers containing five-membered lactam units. Chem. Commun. 48, 6960 (2012).
Chen et al., Copper-catalyzed desaturation of lactones, lactams, and ketones under pH-neutral conditions. J. Am. Chem. Soc. 141, 14889-14897 (2019).
Demmin et al., Copper (II)-induced oxidations of aromatic substrates: catalytic conversion of catechols to o-benzoquinones. Copper phenoxides as intermediates in the oxidation of phenol, and a single-step conversion of phenol, ammonia, and oxygen into muconic acid mononitrile. J. Am. Chem. Soc. 103, 5795-5804 (1981).
Maniyara et al., Highly transparent and conductive ITO substrates for near infrared applications. APL Mater. 9, 021121 (2021).
Yin et al., Hydrophobic and flexible conductive films consisting of PEDOT: PSS-PBA/fluorine-modified silica and their performance in weather stability. J. Mater. Chem. 22, 14042-14051 (2012).
Kapilevich et al., Indium shortage implications for the PV and LCD market: Technology and market considerations for maintaining growth. 2009 34th IEEE Photovoltaic Specialists Conference (PVSC), Philadelphia, PA, USA, 002055-002060 (2009).
Liu et al., Overcoming coulomb interaction improves free-charge generation and thermoelectric properties for n-doped conjugated polymers. ACS Energy Lett. 4, 1556-1564 (2019).
Lu et al., Strategies to enhance the conductivity of n-type polymer thermoelectric materials. Chem. Mater. 31, 6412- 6423 (2019).
Ellmer, Past achievements and future challenges in the development of optically transparent electrodes. Nat. Photonics 6, 809-817 (2012).

\* cited by examiner

METHODS OF MAKING N-DOPED TRANSPARENT ORGANIC CONDUCTORS AND CONDUCTORS MADE THEREFROM

CROSS-REFERENCE TO RELATED APPLICATIONS

The present non-provisional patent application is related to and claims the priority benefit of U.S. Provisional Patent Application Ser. No. 63/419,540, entitled METHODS OF MAKING N-DOPED TRANSPARENT ORGANIC CONDUCTORS AND CONDUCTORS MADE THEREFROM which was filed Oct. 26, 2022, the contents of which are hereby incorporated by reference in its entirety into the present disclosure.

STATEMENT REGARDING GOVERNMENT FUNDING

This invention was made with government support under N00014-19-1-2027 awarded by the Office of Naval Research. The government has certain rights in the invention.

TECHNICAL FIELD

The present disclosure generally relates to an n-doped organic transparent conductor with a work function of −4.4-4.6 eV in the conducting state and a lowest occupied molecular orbital (LUMO) of −5.1 eV in the neutral state.

BACKGROUND

This section introduces aspects that may help facilitate a better understanding of the disclosure. Accordingly, these statements are to be read in this light and are not to be understood as admissions about what is or is not prior art.

Transparent conductors (TCs) are critical components in optoelectronic devices, ranging from light emitting diodes, solar cells, electrochromic devices, touch screens, defrosting windows, and electromagnetic shielding. Among various types of TCs, indium tin oxide (ITO) accounts for approximately 97% of the global TC markets due to its excellent optical transmittance ($T_{550}$~80-85%) in the visible light region and electrical properties (sheet resistance, Rs, 10-100 $\Omega$/sq)[3]. ITO, however, is not free of drawbacks. For instance, ITO thin films are mechanically fragile with a large bending radius and strain. This feature makes ITO undesirable in roll-to-roll manufacturing and flexible electronics. In addition, indium is a rare earth mineral, which has a scarce mineral reserve. With the increasing demand of ITO, indium availability will become highly constrained within two decades and a soaring price has been witnessed in recent years. There is a strong push to find ITO alternatives that offer high performance and low cost, including metal mesh, carbon nanotubes, graphene, earth-abundant metal oxides and organic conductors.

One such replacement for ITO is transparent organic conductors (TOCs). TOCs are pursued mainly due to their solution processability under ambient conditions, mechanical robustness, and potentially low cost. In comparison with other TCs, TOCs commonly suffer from low electrical conductivity and poor durability. PEDOT:PSS is the champion p-doped TOC (p-TOC), and the thin film typically offering a conductivity of 1000-2000 S/cm from commercial Baytron PH1000. With tailored post-treatment such as acid soaking, plasma doping and solution shearing, PEDOT films can reach conductivities over 4000 S/cm and $T_{550}$>85%, and have been used as TOCs. Though n-doped organic conductors have been reported, they are generally not considered as TOCs. For instance, Pei et al. reported doping of benzodifurandione-based oligo(p-phenylene vinylene) (LLPV-1) based polymers with by (4-(1,3-dimethyl-2,3-dihydro-1H-benzoimidazol-2-yl)phenyl)dimethylamine (N-DMBI) to yield n-doped conductors with the highest conductivity of 20-40 S/cm. Fabiano et al. formulated the ink of poly (benzimidazobenzophenanthroline) (BBL) with poly(ethyleneimine) (PEI) in ethanol and produced a n-doped conductor with a conductivity around 10 S/cm. If these polymers were ever considered for n-doped TOCs (n-TOCs), other than their low conductivities and poor visible optical transmittance, the biggest concern would be their chemical and environmental stability. Because their lowest unoccupied molecular orbitals (LUMO) are not sufficiently low enough (i.e., −3.90, −4.10 and −4.50 eV respectively for N2200, BBL and LPPV-1) to avoid water and oxygen reduction reactions, they are only kinetically stable and prone to degrade upon exposure of heat, oxygen and moisture.

Therefore, there is an unmet need for a novel transparent conductor which provides a robust performance to water and oxygen reduction reactions while providing robust electrical, mechanical, and optical performance.

SUMMARY

A transparent conductor (TC) is disclosed. The TC includes an n-doped conducting polymer on a transparent substrate. Thickness of the n-doped polymerized agent is between about 10 to about 200 nm.

According to one embodiment, the n-doped conducting polymer is n-doped polymerized 3,7-dihydrobenzo[1,2-b:4,5-b']difuran-2,6-dione (n-PBDF).

According to one embodiment, light transmissibility in visible wavelength range is between about 380 to about 700.

According to one embodiment, electrical conductivity of the n-doped polymerized agent is between about 100 to about 10000 S/cm.

According to one embodiment, sheet resistance of the n-doped conducting polymer on the substrate is between about $\Omega$/sq to about 10 $\Omega$/sq.

According to one embodiment, the substrate is glass or plastic.

A method of synthesizing an n-doped conducting polymer is also disclosed. The method includes dissolving 3,7-dihydrobenzo[1,2-b:4,5-b']difuran-2,6-dione (BDF) in dimethylsulfoxide (DMSO) in presence of a catalytic amount of copper acetate thereby generating a solution, and heating the solution to an elevated temperature for a predetermined amount of time to thereby generate an n-doped polymerized BDF (n-PBDF).

According to one embodiment of the method, the elevated temperature is between about 50° C. and about 150° C.

According to one embodiment of the method, the elevated temperature is between about 80° C. and about 140° C.

According to one embodiment of the method, the elevated temperature is about 100° C.

According to one embodiment of the method, the predetermined period of time is between about 1 to about 6 hours.

According to one embodiment of the method, the catalytic amount of copper acetate is between about 0.01 to about 0.5 eq.

According to one embodiment of the method, the catalytic amount of copper acetate is about 0.2 eq.

According to one embodiment of the method, conductivity of the n-PBDF is between about 10 to about 5000 S/cm.

According to one embodiment of the method, sheet resistance of the n-doped conducting polymer is between about 1000 Ω/sq to about 10 Ω/sq.

BRIEF DESCRIPTION OF DRAWINGS

FIGS. 4a and 4b provide schematics of synthesis of the title compounds where FIG. 4a represents the radical trapping experiment in the presence and absence of copper catalyst and FIG. 4b represents synthesis of BFD and CCD.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 15%, within 10%, within 5%, or within 1% of a stated value or of a stated limit of a range.

In the present disclosure, the term "substantially" can allow for a degree of variability in a value or range, for example, within 85%, within 90%, within 95%, or within 99% of a stated value or of a stated limit of a range.

A novel transparent conductor (TC) is disclosed herein which provides a robust performance to water and oxygen reduction reactions while providing robust electrical, mechanical, and optical performance. Towards this end, an n-doped polymerized 3,7-dihydrobenzo[1,2-b:4,5-b']difuran-2,6-dione (BDF), hereinafter referred to as n-PBDF, is utilized. A novel method of manufacturing of n-PBDF is disclosed herein, as well as application of n-PBDF to a substrate for use as a transparent conductor and other applications such a electrodes along with electrical and optical characteristics associated therewith.

Figure 1A:
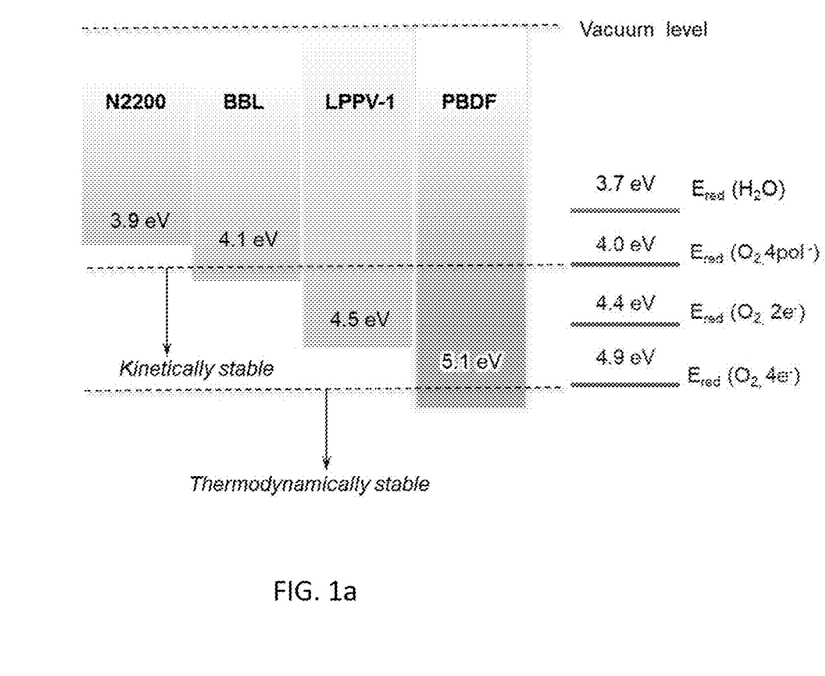
FIGS. 1A and 1B provide lowest unoccupied molecular orbitals (LUMO) value and a schematic of n-doped polymerized 3,7-dihydrobenzo[1,2-b:4,5-b']difuran-2,6-dione (n-PBDF) (n-PBDF) chemical structure in comparison to LUMO values and schematics chemical structures of prior art TCs.
Figure 1B:
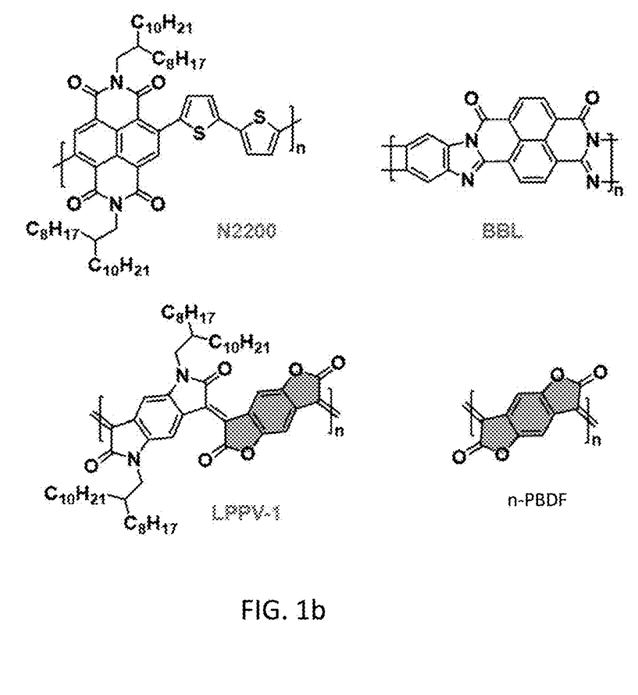

As discussed above, the prior art transparent organic conductors (TOCs) present challenges with water and oxygen reduction reactions. To ensure proper resilience to water and oxygen reduction reactions, the lowest unoccupied molecular orbitals (LUMO) should be sufficiently below −4.5 eV. For example, in one instance doping of benzodifurandione-based oligo(p-phenylene vinylene) (LLPV-1) based polymers with by (4-(1,3-dimethyl-2,3-dihydro-1H-benzoimidazol-2-yl)phenyl)dimethylamine (N-DMBI) yielded n-doped conductors with the highest conductivity of 20-40 S/cm. Specifically, LPPV-1 exhibits the lowest LUMO of −4.37 eV, which makes it kinetically stable and the state-of-the-art n-type semiconducting polymer. LPPV-1 contains an electron deficient 3,7-dihydrobenzo[1,2-b:4,5-b']difuran-2,6-dione (BDF) along the backbone. A LUMO of −4.94 eV can be realized for the polymerized BDF (PBDF), in comparison with the calculated −4.37 eV for LPPV-1. n-PBDF yields a LUMO of −5.1 eV, the lowest reported n-dopped conjugated polymers. Referring to FIGS. 1A and 1B, LUMO value and a schematic of n-PBDF chemical structure is provided in comparison to LUMO values and schematics chemical structures of prior art TCs showing a thermodynamically stable n-PBDF with deep LUMO level at 5.1 eV. n-PBDF is solution-processable with low sheet resistance and high optical transmittance that can rival ITO. Additionally, n-PBDF ink is shelf-stable and can endure storage temperatures from −20° C. to 65° C. n-PBDF thin films present a work function of 4.4-4.6 eV and are air, moisture and thermally stable.

The present disclosure provides a novel synthesis approach specifically tailored for TC applications. All regents and solvents for the synthesis and analysis were purchased from Aldrich, Alfa Aesar, TCI and were used without purification unless otherwise mentioned. PEDOT:PSS (PH 1000) was purchased from Ossila and was filtered through a 1 mm filter before usage. ECP-Blue and ProDOT-EDOT, was synthesized as previous research.

Figure 2A:
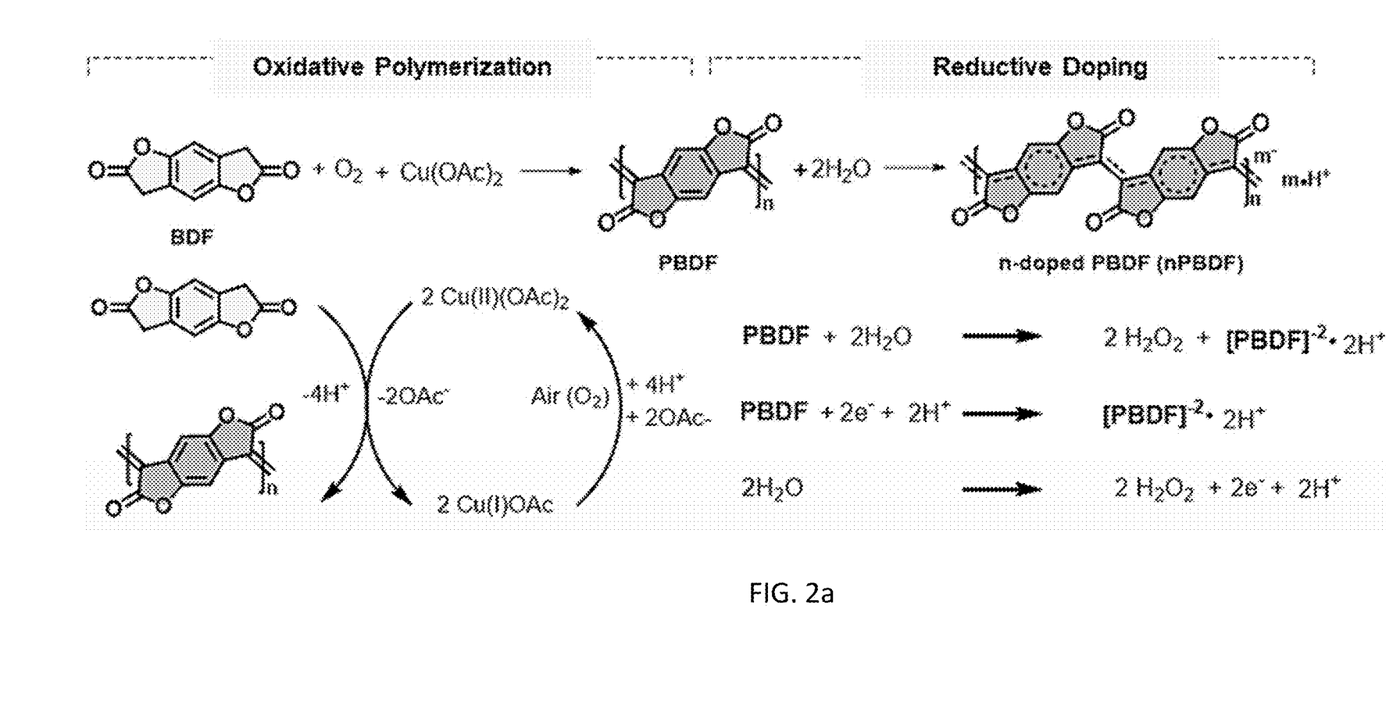
FIG. 2a is a schematic of synthesis of n-PBDF, according to the present disclosure.
Figure 2B:
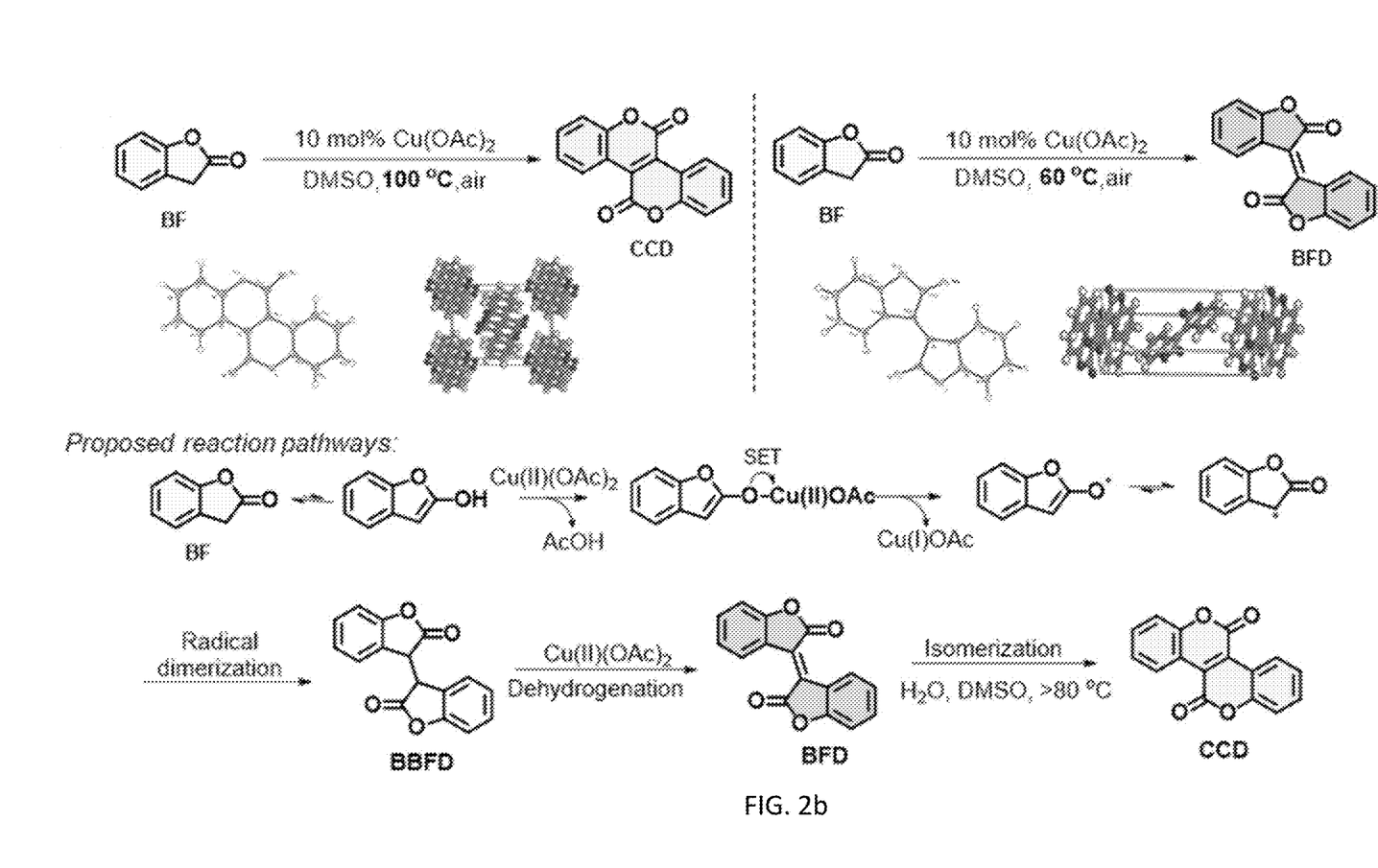
FIG. 2b is a schematic of the formation of model compound of (E)-2H,2'H-[3,3'-bibenzofuranylidene]-2,2'-dione (BFD, known as isoxindigo), and its structural isomer chromeno[4,3-c]chromene-5,11-dione (CCD, also known as dibenzonaphthyrone), and the disclosed reaction pathways.
Figure 3:
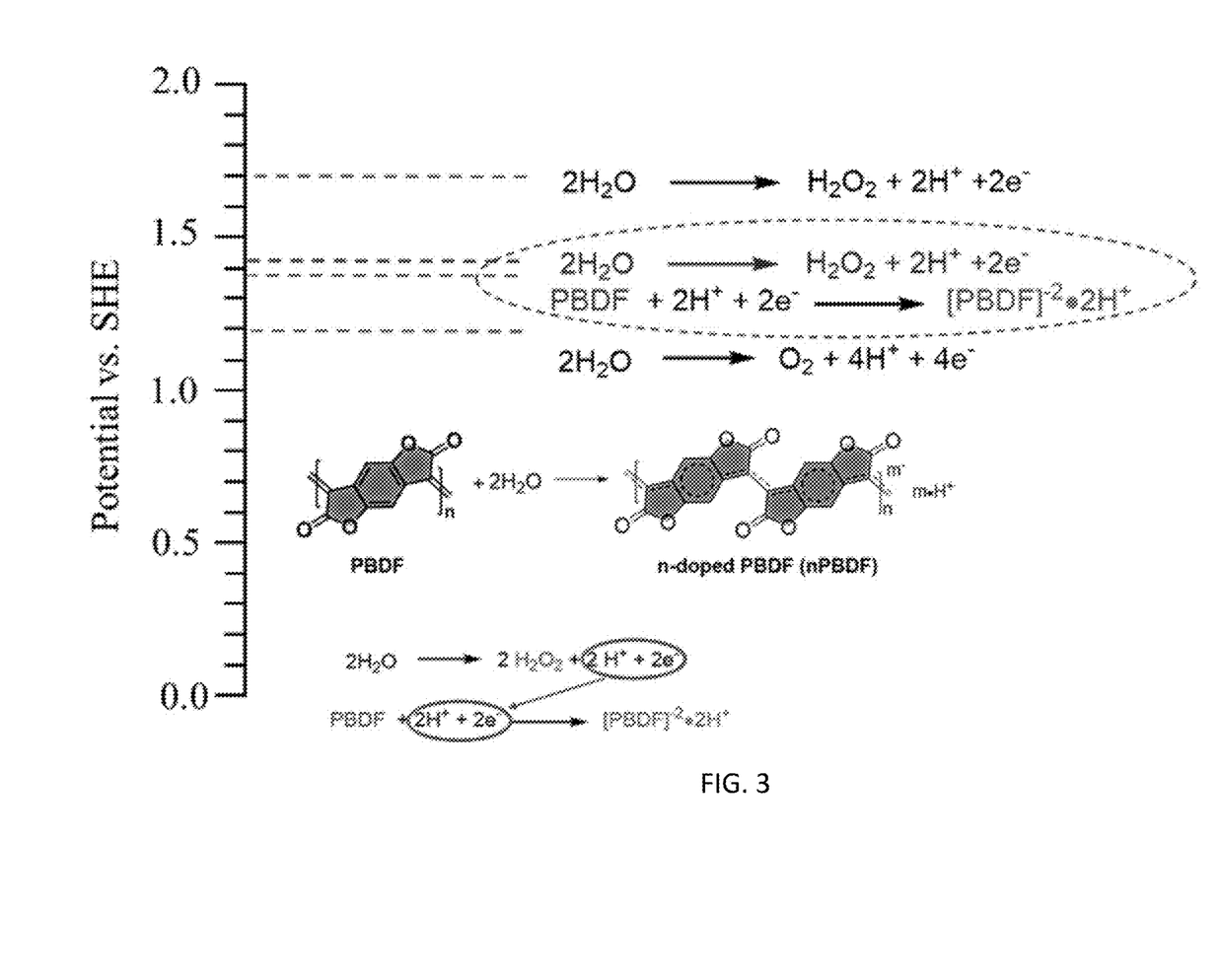
FIG. 3 is an energy diagram of oxidation reaction of $h_2O_2$ generation via water and oxygen oxidation.

The synthesis involves copper-catalyzed oxidative polymerization of BDF and reductive doping of the obtained polymer PBDF in one pot to yield n-PBDF. Referring to FIG. 2a, a schematic of synthesis of n-PBDF is presented, according to the present disclosure. BDF was dissolved in dimethylsulfoxide (DMSO) in the presence of catalytic amount of copper acetate. The solution was heated to 100° C. for 6 hours in air. Depending on reaction conditions, conductive n-PBDF can be obtained in the form of solution, gel and insoluble solid. The details can be found in Table 1. PBDF is formed through copper catalyzed oxidative polymerization, which immediately undergoes reductive doping through water oxidation to yield n-PBDF and hydrogen peroxide, as illustrated in FIG. 2a. Doping of PBDF by water oxidation has been confirmed experimentally by the detection of hydrogen peroxide, as shown in FIG. 3, which is an energy diagram of oxidation reaction of $H_2O_2$ generation via water and oxygen oxidation. To better understand copper catalyzed oxidative polymerization, we performed model reactions, involving benzofuran-2(3H)-one (BF, also known as 2-coumaranone), as shown in FIG. 2b. Specifically, FIG. 2b provides a schematic of the formation of model compound of BFD and its structural isomer chromeno[4,3-c]chromene-5,11-dione (CCD, also known as dibenzo-naphthyrone), and the disclosed reaction pathways. The crystal structures and packing motifs of BDF and CCD With 1 or 10 mol % of Cu $(OAc)_2$, BF can quantitatively convert to a yellow solid in DMSO within 6 hours at 100° C.

TABLE 1

Investigation of polymerization condition

| Entry | Cu(OAc)$_2$ (equiv.) | Additive (equiv.) | Temperature (° C.) | Solubility | Conductivity (S/cm) |
|---|---|---|---|---|---|
| 1[a] | 0.02 | — | 100 | Solution | 11.7 ± 0.4 |
| 2[a] | 0.1 | — | 100 | Solution-gel | 250 ± 10 |
| 3[a] | 1.0 | — | 100 | Gel-solid | 2100 ± 300 |
| 4[a] | 0.1 | — | 60 | Solution-gel | 310 ± 20 |
| 5[a] | 0.1 | — | 140 | Gel | 40 ± 5 |
| 6[a] | 0.1 | — | 180 | Gel | 33 ± 3 |
| 7[a] | 0.1 | TEMPO (2.0) | 100 | Viscous solution | 31.0 ± 0.5 |
| 8[a] | 0.1 | HQ (0.1) | 100 | Solution-gel | 840 ± 40 |
| 9[a] | 0.1 | HQ (2.0) | 100 | Solution-gel | 68 ± 8 |
| 10[a] | 0.1 | HQ (5.0) | 100 | Solution-gel | 61.3 ± 0.5 |
| 11[a] | 0.1 | TMHQ (0.1) | 100 | Solution-gel | 600 ± 100 |
| 12[a] | 0.1 | TMHQ (2.0) | 100 | Solution-gel | 1200 ± 300 |
| 13[a] | 0.1 | TMHQ (5.0) | 100 | Gel | 1000 ± 300 |
| 14[b] | — | BQ (2.0) | 100 | Viscous solution | ~8.1 × 10$^{-5}$ |
| 15[b] | — | TMQ (2.0) | 100 | Viscous solution | 3200 ± 300 |
| 16[a][c] | — | TMQ (2.0) | 100 | solution | 165 ± 6 |

[a] Under air; [b] in nitrogen, [c] spin coating. All films are from drop casting unless noted.

Figure 4A:
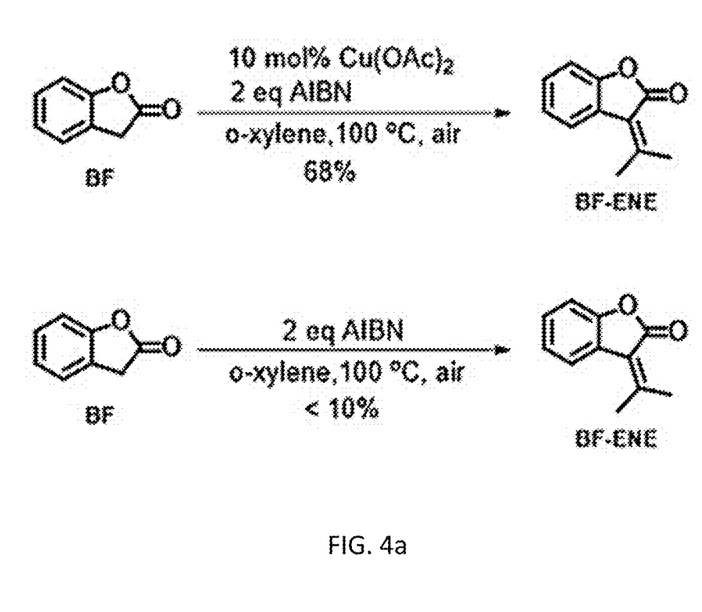
Figure 4B:
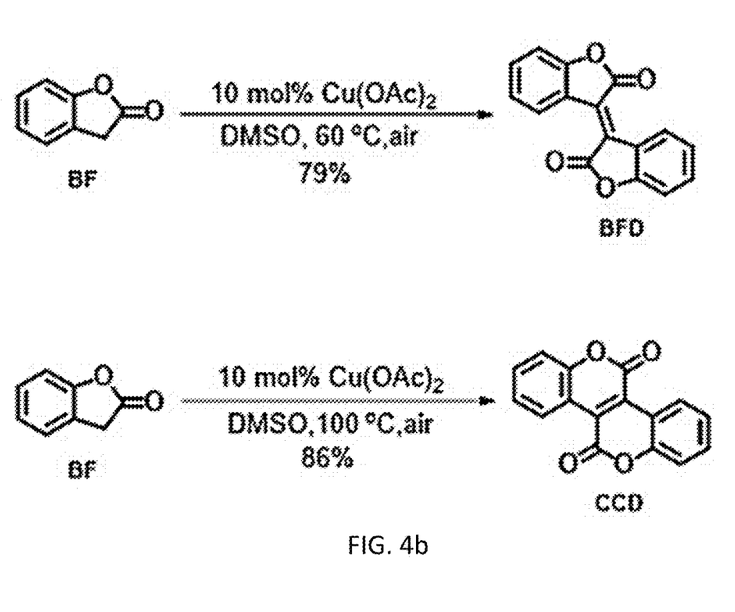
Figure 5:
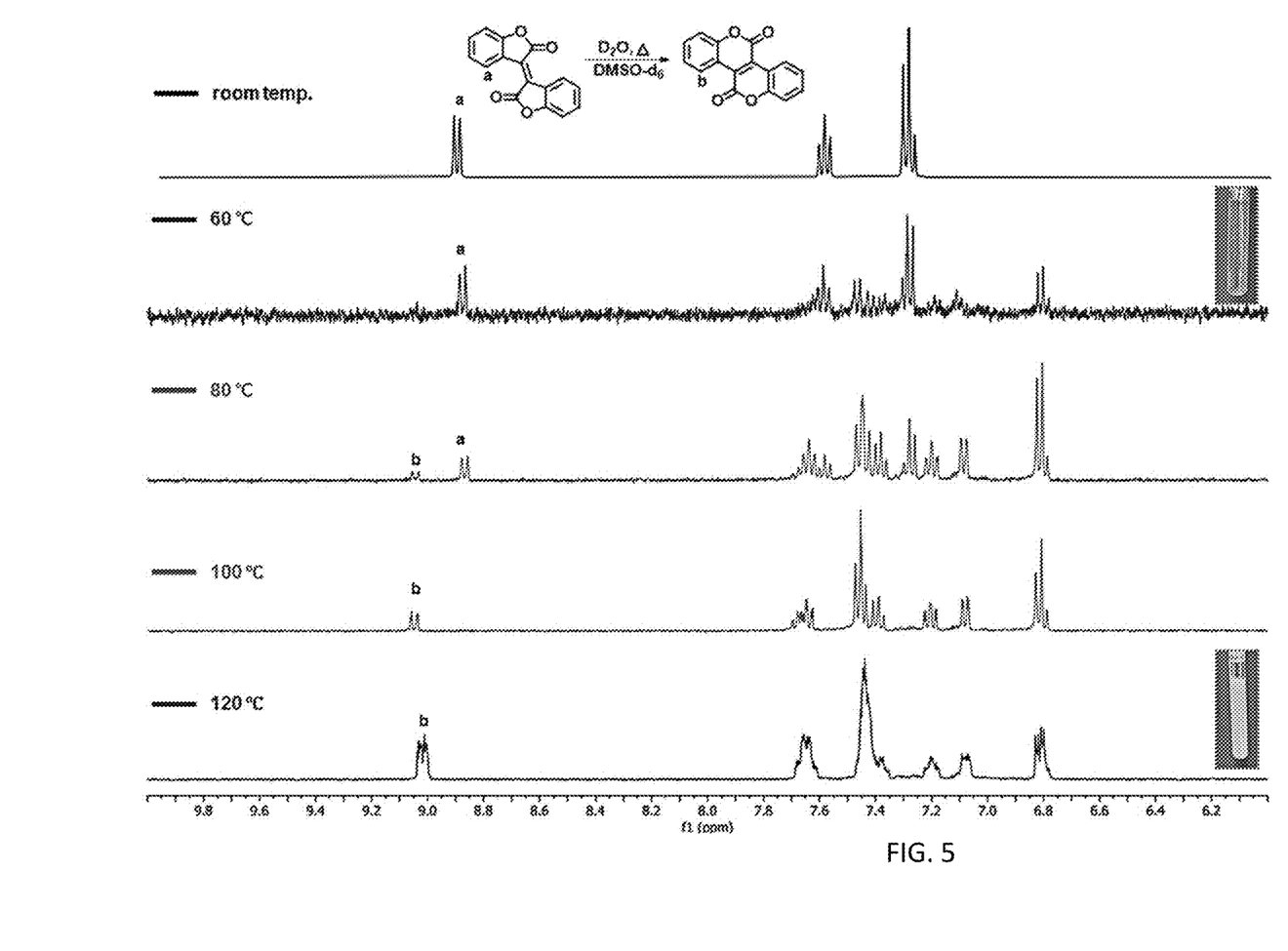
FIG. 5 provides graphs of temperature-dependent Proton nuclear magnetic resonance ($^1$H NMR) spectrum of BFD with deuterated water in dimethylsulfoxide (DMSO)-$d_6$.

Surprisingly, the formed product is not the expected (E)-2H,2'H-[3,3'-bibenzofuranylidene]-2,2'-dione (BFD, known as isoxindigo), but instead CCD. When the same reaction is performed under 60° C., only BFD is observed in the reaction. The enol form of BF coordinates with $Cu(OAc)_2$ through the ligand exchange. Through the single electron transfer (SET), oxygen-centered radical is formed and transforms into a more stable carbon-center radical isomer, accompanied by the reduction of Cu(II) to Cu(I). It quickly dimerizes and forms [3,3'-bibenzofuran]-2,2'(3H, 3'H)-dione (BBFD), which is immediately converted into BFD through copper-catalyzed dehydrogenation. It should be appreciated that BBFD is an intermediate product and cannot be isolated from the reaction. The radical pathway of dimerization is suggested by in-situ temperature-dependent Nuclear Magnetic Resonance (NMR) measurements. Broadening and diminishing of the proton peaks are observed. The more explicit evidence comes from the radical trapping experiment with azobisisobutyronitrile in the presence and absence of the copper catalyst. The trapping reaction is depicted in FIGS. 4a and 4b, which provide schematics of synthesis of the title compounds where FIG. 4a represents the radical trapping experiment in the presence and absence of copper catalyst and FIG. 4b represents synthesis of BFD and CCD. The conversion of BFD to CCD is confirmed with temperature-dependent NMR measurements. In the presence of deuterated water and DMSO, BFD starts to convert to CCD around 80° C., as shown in FIG. 5, which provides graphs of temperature-dependent proton NMR ($^1$H NMR) spectrum of BFD with deuterated water in DMSO-$d_6$. The conversion is very efficient at 100° C., which explains that only CCD is formed when the copper catalyzed oxidative coupling is carried out at 100° C. or higher temperatures. The chemical structures of BFD, CCD and the radical trapping product have been confirmed by $^1$H-NMR, $^{13}$C-NMR, HRMS, and single-crystal structures.

Figure 2C:
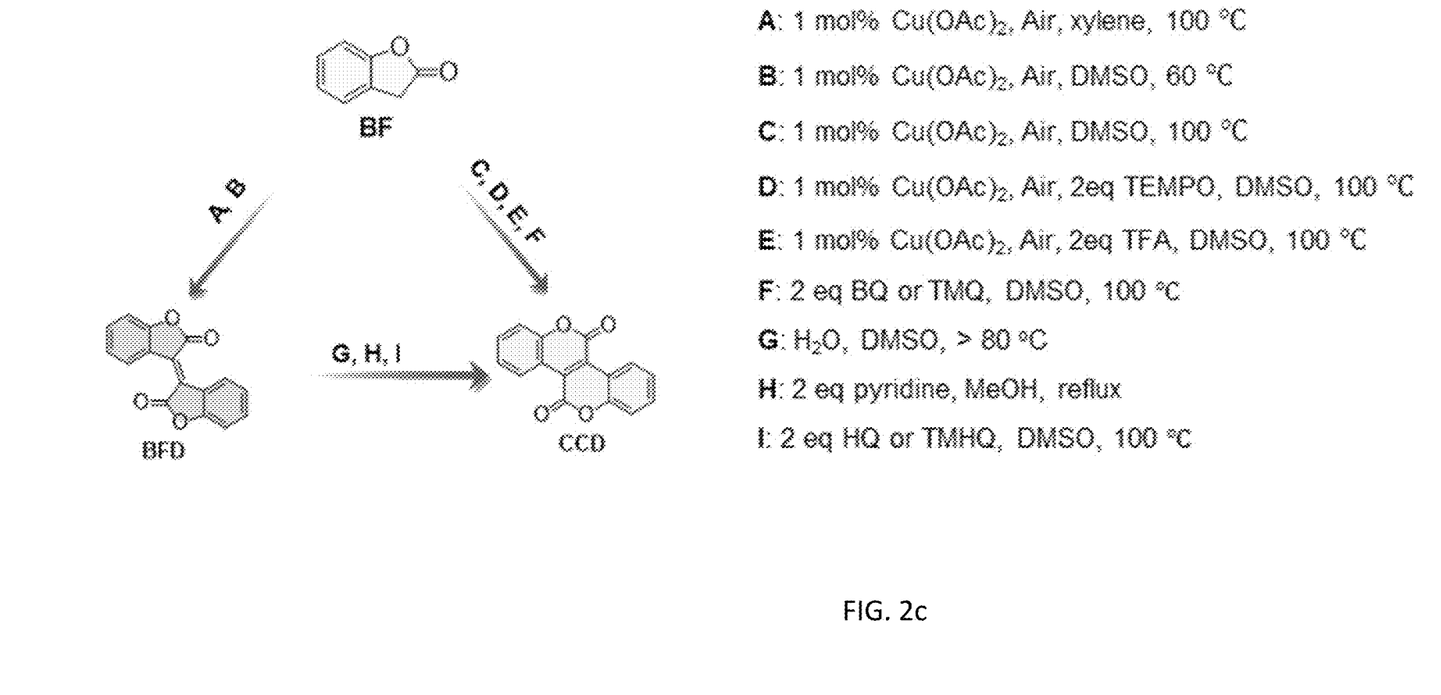
FIG. 2c is a schematic showing chemical transformations among benzofuran-2(3H)-one (BF, also known as 2-coumaranone), BFD and CCD under various reaction conditions.

Impact of reaction conditions were investigated in order to understand the defect formation in polymerization. The reactions are highlighted in FIG. 2c, which is a schematic showing chemical transformations among BF, BFD and CCD under various reaction conditions. In short, BFD is exclusively formed in xylene, regardless of reaction temperatures (60-120° C.). In DMSO, BFD is formed at a low reaction temperature (about 60° C.). A mixture of BFD and CCD is initially observed when the temperature is set at 100° C. in reactions promoted by copper acetate, benzoquinone (BQ), or tetramethylbenzoquinone (TMQ). If the reaction is operated at 120° C., only CCD can be observed as the only product. Other than previously mentioned water promoted conversion from BFD to CCD, it can also be facilitated by pyridine, hydroquinone (HQ) and tetramethylhydroquinone (TMHQ). Interestingly, we found that BFD can also promote the formation of BFD and CCD from BF, similarly with how TMQ functions. Further, it seems that BFD is more effective than TMQ to drive this chemical transformation, as evidenced by the fact BFD can promote this reaction in xylene, as well as in DMSO at low temperatures. TMQ is not able to facilitate this transformation in xylene. This series of model reactions indicates that CCD can be incorporated into the n-type polymer backbone as a source of structural defects.

We now turn to the impact of polymerization conditions on conductivity and processability, which are correlated with degree of polymerization, doping efficiency and defect formation. The results are highlighted in Table 1. We first studied the influence of the catalyst loading. As the copper acetate loading increases from 0.02, 0.2, to 1 eq, the conductivities of the polymer thin films increase from 12 to, 250 to 2100 S/cm. It is also accompanied by the gradual loss of solubility in DMSO, which results from a higher degree of polymerization and the presence of copper (II) ion residue. We then studied the impact of reaction temperatures (entries 2, 4,5 and 6), which can affect defect formation and degree of polymerization. The conductivity from the polymerization carried out at 60° C. is 310 S/cm, higher than 250 S/cm at 100° C. and is ten times higher than those at 140 and 180° C. There is a higher probability that CCD can be incorporated into polymer backbones at elevated temperatures. This incorporation has a negative influence on conductivity, though high temperature is favored for degree of polymerization. In the model reaction the addition of (2,2,6,6-tetramethylpiperidin-l-yl)oxidanyl (TEMPO) would facilitate the formation of CCD. When 2 eq TEMPO is added (entry 7), the conductivity drops to 31 S/cm from 250 S/cm. We further investigated doping efficiency and hypothesized that proton-coupled electron transfer agents such as hydroquinone (HQ) and tetramethylhydroquinone (TMHQ) will be more effective in reductive doping than water. From entries 8, and 11-13, it confirms that the addition of HQ and TMQ are indeed beneficial for conductivity improvement. It is also noted that the additives can improve the solubility of n-PBDF in DMSO. It is known that copper acetate can efficiently oxidize HQ and TMHQ into BQ and TMQ. We find that TMQ itself can perform the oxidative polymerization and reductive doping in the absence of a copper catalyst, while BQ is not effective (entry 14 and 15). This is in an agreement with the latest report by Huang et al. It is also noted TMQ promoted polymerization is much more favored under nitrogen than in air (entry 16).

We now turn to utilization of n-PBDF as an n-doped transparent organic conductor (n-TOC). Indium tin oxide (ITO) coated glass (15 Ω/sq), silicon wafer (University Wafer), and glass slide microscopes were cleaned by consecutive sonication in soup water, acetone and IPA for 15 minutes. After drying the substrates with nitrogen, substrates were exposed to UV-Ozon treatment (HELIOS-500 Ultraviolet-Ozone Cleaner) for 20 minutes to remove any organic contamination and increase surface hydrophilicity. For bottom contact electrodes, titanium (5 nm with 0.1 Å/s) followed by gold (40 nm, 0.3 Å/s) was thermally deposited at low vacuum ($10^{-6}$ mbar). For top contact electrodes (dropped cast films), 100 nm gold was deposited at slow rate (0.05 Å/s) for the first 20 nm and then the rate ramps up to 0.3 Å/s for the rest of the deposition. Thin film was prepared by off-center spin coating at various rates and layer by layer method to achieve the desired thickness. Each layer was dried in vacuum oven (at 500 microns pressure at room temperature) for 1 to 2 hours before casting another layer or measuring the electrical properties. Other methods such as preheating solution or substrate to 60-80° C. can decrease the drying time of the conductive ink, but temperatures higher than 100° C. causes formation of non-uniform film on substrate due to fast aggregation of the ink or roll back of ink from edges. For thick films, Kapton tape (1 Mil) was used to define a 10×10 mm² area and films were dried in vacuum oven with same conditions over night to make sure any residual solvent is removed.

Figure 6A:
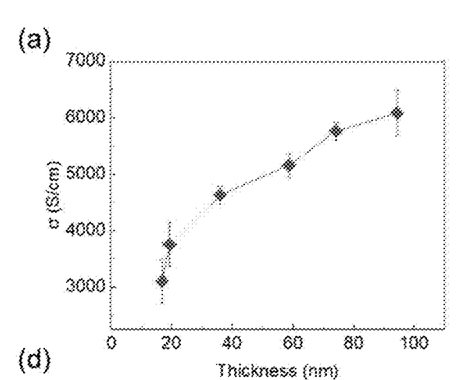
FIG. 6a is a plot of the conductivity in S/cm of the thin films vs. thickness ranging from 17 nm to 94 nm.
Figure 6B:
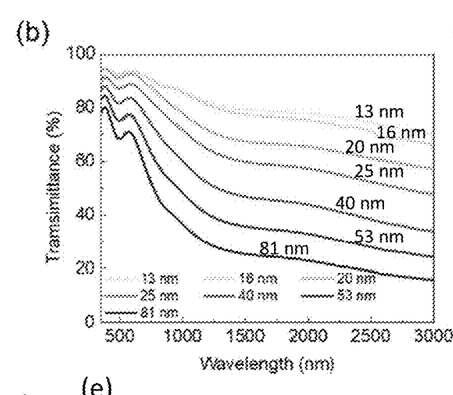
FIG. 6b is a plot of ultraviolet-visible-near infrared (UV-Vis-NIR) transmittance of n-PBDF thin film at different thicknesses.
Figure 6C:
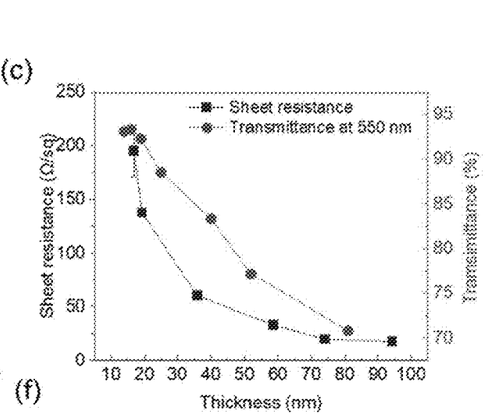
FIG. 6c is a plot of sheet resistance and transmittance at 550 nm of thin film n-PBDF where sheet resistance and optical transmittance are plotted with film thickness.

In drop-cast micrometers thick films, n-PBDF exhibits low sheet resistance and high electrical conductivity. At such thicknesses, however, n-PBDF is completely black. To investigate whether n-PBDF can function as a high-performance TOC, we investigated the relationship between optical transmittance and electrical conductivity. Taking the ink from optimized polymerization conditions, we prepared a series of thin films on ozone-treated glass substrates via a spin-coating method. Film thickness is controlled by spin conditions and the number of layers through sequential coating. The detailed thin film preparation are described further below. The atomic force microscopy (AFM) images show similar surface morphology and small roughness (RMS about 1.2-1.5 nm) among samples. Referring to FIG. 6a, a plot of the conductivity in S/cm of the thin films vs. thickness ranging from 17 nm to 94 nm is provided. n-PBDF thin film at 17 nm and 19 nm show high conductivity of 3100 S/cm and 3800 S/cm, measured by the Van de Pauw method, known to a person having ordinary skill in the art. The conductivity of n-PBDF increases as the film thickness increases. It reaches 6100 S/cm around 94 nm. Hall measurements were carried out to provide further insight about the high conductivity, in which charge carrier concentration is estimated to be about $5 \times 10^{22}$ $cm^{-3}$ and the electron mobility is about 0.5 $cm^2V^{-1}$ $s^{-1}$ for a film with thickness of 20 nm. This high charge carrier concentration and carrier mobility explain the charge transport at the critical regime and high conductivity. Optical transmittance of n-PBDF thin films is plotted with film thickness, as shown in FIG. 6b, which is a plot of UV-Vis-NIR transmittance of n-PBDF thin film at different thicknesses. n-PBDF shows a high transmittance in the visible region but a broad and strong absorption in near infrared (NIR) and middle infrared range. High conductivity and low absorption coefficient in the visible region of the thin films make it legitimate to claim n-PBDF as a TOC, which is evident in FIG. 6c, which is a plot of sheet resistance and transmittance at 550 nm of thin film n-PBDF where sheet resistance and optical transmittance are plotted with film thickness. At 550 nm wavelength which human eye is the most sensitive to, n-PBDF has an optical transparency over 80% with a sheet resistance around 45 Ω/sq. Figure of merit for transparent conductors, $\Phi_{TC}$, can be calculated using equation below:

$$\phi_{TC} = \frac{T_{550\,nm}}{\sqrt[10]{R_{sq}}}$$

wherein $T_{550\,nm}$ represents the transmittance at 550 nm and $R_{sq}$ is sheet resistance in Ω/sq.

Figure 6D:
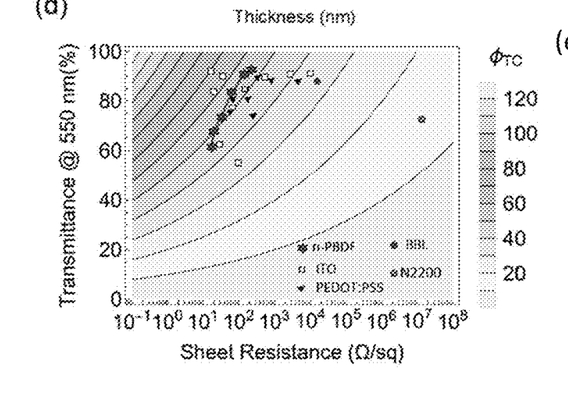
FIG. 6d is a plot of transmittance at 550 nm vs. sheet resistance in Ω/sq represents figure of merit of transparent conductors, n-PBDF (star), ITO (square), PEDOT:PSS (triangle), BBL (dots), N2200 (pentagon) as a function of sheet resistance and transmittance at 550 nm and which summarizes the heat map of ITC for ITO, PEDOT:PSS, n-PBDF, N2200, BBL, as a function of sheet resistance and optical transmittance at 550 nm.

Next reference is made to FIG. 6d which is a plot of transmittance at 550 nm vs. sheet resistance in Ω/sq represents figure of merit of transparent conductors, n-PBDF (star), ITO (square), PEDOT:PSS (triangle), BBL (dots), N2200 (pentagon) as a function of sheet resistance and transmittance at 550 nm and which summarizes the heat map of $\Phi_{TC}$ for ITO, PEDOT:PSS, n-PBDF, N2200, BBL, as a function of sheet resistance and optical transmittance at 550 nm. n-PBDF conductive thin films rival with ITO and are superior to other n-doped organic conductors. The work function of n-PBDF is estimated with Kelvin Probe Force Microscopy (KPFM) and ultraviolet photoemission spectroscopy (UPS), which give −4.4 eV and −4.6 eV respectively. These numbers are at the same level as n-doped ITO of 4.4-4.7 eV. Thus, n-PBDF is established as a high-performance n-TOC.

Figure 6E:
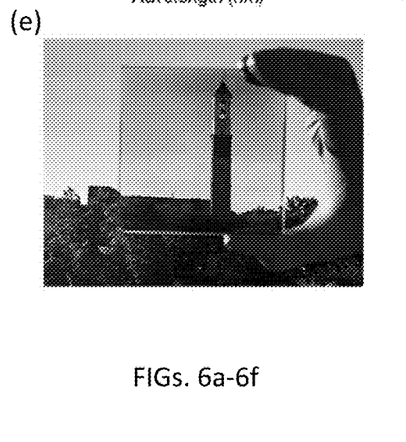
FIG. 6e is a photograph of an n-PBDF conductive ink coated on a 10×10 cm$^2$ glass substrate through a bar coating method, known to a person having ordinary skill in the art.
Figure 6F:
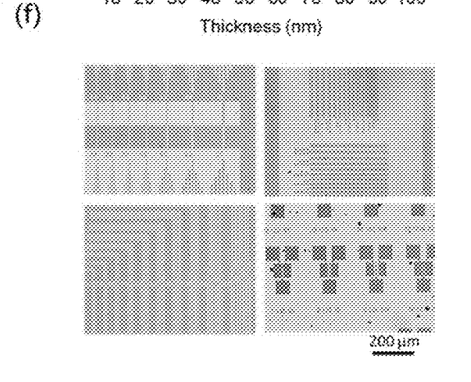
FIG. 6f is a photograph of well-defined micropatterns with various sizes and shapes can be prepared from n-PBDF films over a large area through the conventional microfabrication process.

Solution-processability is one of the most appealing features for TOCs. Thus, we also explored the potential of n-PBDF ink for a laboratory-scale large-area coating. In FIG. 6e, n-PBDF conductive ink is coated on a 10×10 $cm^2$ glass substrate through a bar coating method, known to a person having ordinary skill in the art. The obtained TOC film is uniform with high electrical conductivity and optical transmittance. Being patternable is a desired and necessary feature for transparent conductors and is particularly important in printed electronics. Despite that n-PBDF is both chemically and photochemically robust, it can be etched under a strong oxygen plasma. Here photolithograph patterned micropatterns are exhibited in FIG. 6f. As shown, well-defined micropatterns with various sizes and shapes can be prepared from n-PBDF films over a large area through the conventional microfabrication process. Noticeably, the high-resolution n-PBDF patterns with a feature size down to 2 µm are achieved, including the 2 µm fine lines and 1 µm gaps between lines. In comparison with the ITO micropatterning process, n-PBDF patterning is much more versatile and efficient.

Figures 7A, 7B, 7C, 7D:
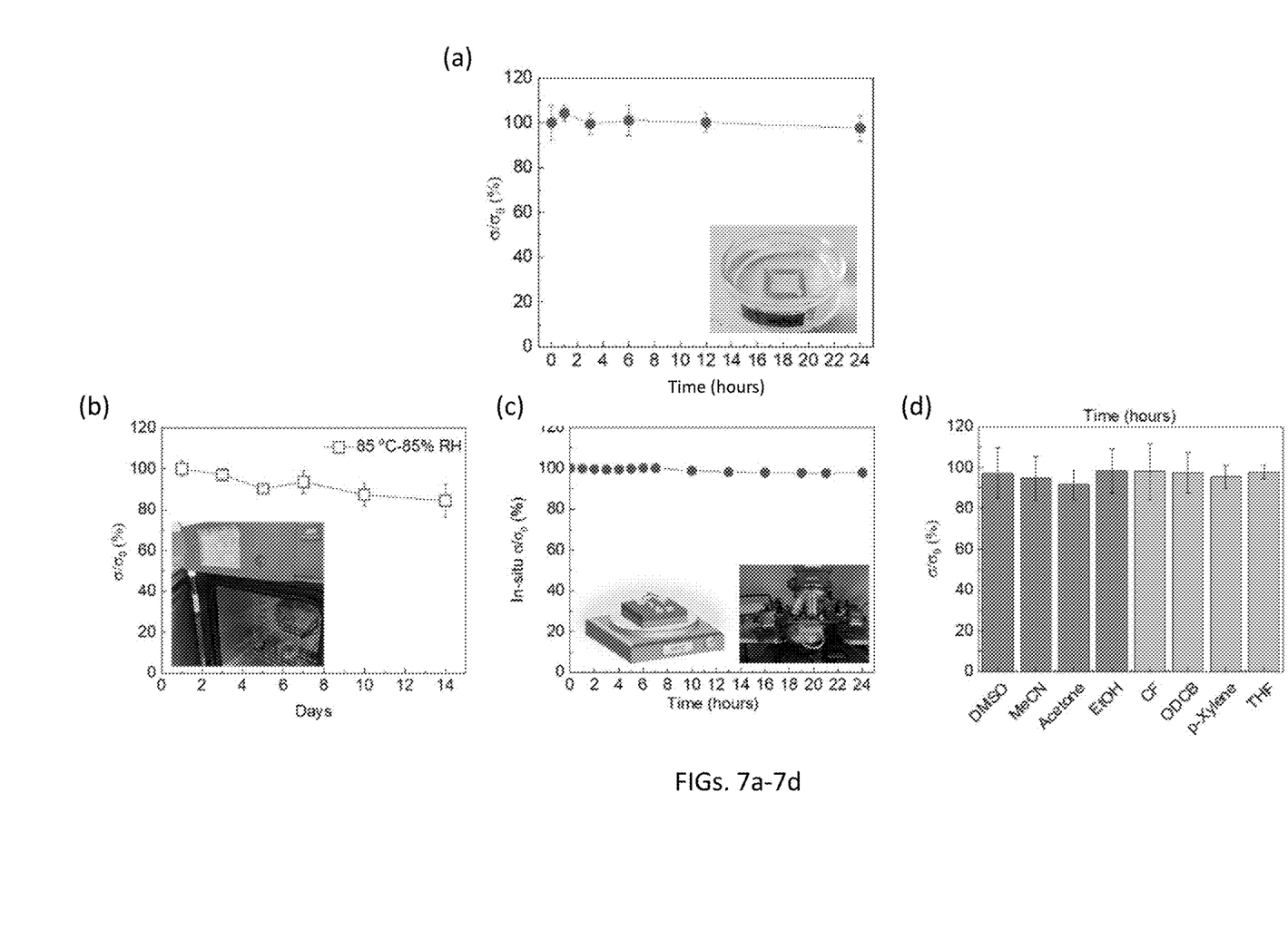
FIG. 7a is a normalized graph of conductivity over time of n-PBDF thin film immersed in DI water for 24 hours shows that the conductivity barely changes among each measurement.
FIG. 7b is another normalized graph of conductivity over time depicting conductivity change of n-PBDF thin film stored in weathering chamber at 85° C./85% RH for 14 days.
FIG. 7c is a graph of conductivity over time showing in-situ conductivity measurement of n-PBDF thin film baking at 100° C. in ambient conditions for 24 hours.
FIG. 7d is a bar graph showing stability of n-PBDF thin film exposed to common organic solvents, including DMSO, acetonitrile (MeCN), acetone, ethanol (EtOH), chloroform (CF), ortho-dichlorobenzene (ODCB), p-xylene and tetrahydrofuran (THF)), to mimic the process of spin coating for multilayer coating.

Moisture is often detrimental for n-type charge transport. As previously discussed, however, n-PBDF is n-doped through water oxidation. n-PBDF has an excellent stability towards water. n-PBDF thin films are submerged in distilled water over 24 hours. The conductivity is measured at 2, 4, 6, 12, and 24 hours after drying vacuum for 2 hours. FIG. 7a which is a normalized graph of conductivity over time of n-PBDF thin film immersed in DI water for 24 hours shows that the conductivity barely changes among each measurement. The weather durability testing is mandatory for electronic products and components. To check the durability of n-PBDF thin films as n-TOC, they are placed and tested in the weathering chamber with 85% relative humidity at 85° C., as shown in FIG. 7b, which is another normalized graph of conductivity over time depicting conductivity change of n-PBDF thin film stored in weathering chamber at 85° C./85% RH for 14 days. It is found that the conductivity retains for 14 days. Overheating is a common problem in electronics. To test whether n-PBDF can sustain at an elevated temperature, n-PBDF thin film is placed on a heated probe station as illustrated and shown in FIG. 7c, which is a graph of conductivity over time showing in-situ conductivity measurement of n-PBDF thin film baking at 100° C. in ambient conditions for 24 hours. It is found that less than 1% change in conductivity is present for a sample heated at 100° C. for 24 hours. In other words, n-PBDF can function reliably under overheating. In the fabrication of printed electronics, multilayers of materials are often needed. It is extremely beneficial if n-PBDF is solvent resistant, so that the top layer can be directly laid down on the top of n-PBDF via an orthogonal solution processing. We have examined a wide range of commonly used solvents in printed electronics, including DMSO, acetonitrile, acetone, ethanol, chloroform, ortho-dichlorobenzene, p-xylene and tetrahydrofuran. The solvent is dropped onto the n-PBDF thin film for 10-30 seconds and then removed by spin coating (FIG. 7d, which is a bar graph showing stability of n-PBDF thin film exposed to common organic solvents, including DMSO, acetonitrile (MeCN), acetone, ethanol (EtOH), chloroform (CF), ortho-dichlorobenzene (ODCB), p-xylene and tetrahydrofuran (THF)), to mimic the process of spin coating for multilayer coating. There is no significant change in electrical conductivity for nearly all examined thin films, which suggests orthogonal solution processing is compatible with n-PBDF films. We further tested the solvent resistance of n-PBDF thin films by immersing them in solvents for ten minutes and one hour. Other than acetone and THF, the rest of the samples retains at least of 90% of their initial conductivity.

To Investigate the impact of polymerization conditions on the polymer electrical performance, we measured the sample sheet resistance through top contact four-probe measurement. 90 uL polymer inks were deposited on the clean Si/SiO$_2$ substrates and then the drop-casted samples were placed in the vacuum oven at room temperature for 10 hours for drying out residual solvent. Then gold four electrodes (channel width of 100 µm and channel length of 1000 µm for the active area) are thermally deposited through shadow masks on the top of thin films, with the slow rate amount 0.1 Å/s to a final thickness of 100 nm.

We used bottom contact and Van de Pauw configuration to accurately measure thin film samples conductivity. To improve the adhesion of gold electrodes to substrate, titanium was firstly deposited at slow rate of 0.2 Å/s with 5 nm thickness and then gold was deposited with the rate of 0.3 Å/s with thickness of 40 nm. Then polymer thin films were fabricated on top of substrates with electrodes by using different coating methods. Before measurement, the polymer thin films were scratched to form a cloverleaf pattern. Current (I) with range from (−0.001 A to 0.001 A) was sourced through two adjacent electrodes, and potential difference (ΔV) was measured in between the other two electrodes. The resistance is calculated as the slope of I-ΔV curve. To obtain an accurate estimation of conductivity, resistance was measured from four directions of the thin films, by switching the source and sense electrodes. Sheet resistance then was calculated using following equation:

$$R_s = \frac{\pi}{\ln 2} \times R_{ave} \approx 4.53 \times R_{ave}$$

wherein $R_{ave}$ is the average resistance measured from four directions. Conductivity of films were then calculated by equation below:

$$\sigma = \frac{1}{R_s t}$$

where t is film thickness was measured by profilometer. For stability tests, 4 electrode pattern was used to measure the conductivity of the films.

n-PBDF films were also patterned using conventional photolithography in combination with oxygen plasma etching (PE-25, Plasma Etch Inc., 400 W). A photoresist, AZ1518 (Microchemicals) was spin-coated on the polymer films as an etch blocking layer (4000 rpm, 50 s). The films were annealed at 110° C. for 2 min for soft-baking. The films were then exposed to the near-UV light (405 nm, 130 mJ/cm$^2$) using maskless aligner (Heidelberg MLA150). The films were developed with developer (Microposit, MF-26A) for 45 sec. After DI water cleaning, the patterned films were exposed to etching plasma for 30 min at 1 mT vacuum. After that, the photoresist was removed in acetone.

Those having ordinary skill in the art will recognize that numerous modifications can be made to the specific implementations described above. The implementations should not be limited to the particular limitations described. Other implementations may be possible.

The invention claimed is:

1. A method of synthesizing an n-doped conducting polymer, comprising:
dissolving 3,7-dihydrobenzo[1,2-b:4,5-b'] difuran-2,6-dione (BDF) in dimethylsulfoxide (DMSO) in presence of a catalytic amount of copper acetate thereby generating a solution; and
heating the solution to an elevated temperature for a predetermined amount of time to
thereby generate an n-doped polymerized BDF (n-PBDF).

2. The method of claim 1, wherein the elevated temperature is between about 50° C. and about 150° C.

3. The method of claim 2, wherein the elevated temperature is between about 80° C. and about 140° C.

4. The method of claim 3, wherein the elevated temperature is about 100° C.

5. The method of claim 1, wherein the predetermined period of time is between about 1 to about 6 hours.

6. The method of claim 1, wherein the catalytic amount of copper acetate is between about 0.01 to about 0.5 eq.

7. The method of claim 6, wherein the catalytic amount of copper acetate is about 0.2 eq.

8. The method of claim 6, wherein conductivity of the n-PBDF is between about 10 to about 5000 S/cm.

9. The method of claim 8, wherein sheet resistance of the n-doped conducting polymer is between about 1000 Ω/sq to about 10 Ω/sq.

* * * * *